(12) United States Patent
Nakatani

(10) Patent No.: US 10,768,870 B2
(45) Date of Patent: Sep. 8, 2020

(54) IMAGE FORMING SYSTEM AND IMAGE FORMING METHOD

(71) Applicant: Kyocera Document Solutions Inc., Osaka (JP)

(72) Inventor: Ryusuke Nakatani, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/382,199

(22) Filed: Apr. 12, 2019

(65) Prior Publication Data

US 2019/0317705 A1 Oct. 17, 2019

(30) Foreign Application Priority Data

Apr. 17, 2018 (JP) .................................. 2018-079178

(51) Int. Cl.
*G06F 3/12* (2006.01)

(52) U.S. Cl.
CPC .......... *G06F 3/1226* (2013.01); *G06F 3/1204* (2013.01); *G06F 3/1207* (2013.01); *G06F 3/1238* (2013.01); *G06F 3/1267* (2013.01); *G06F 3/1268* (2013.01); *G06F 3/1288* (2013.01)

(58) Field of Classification Search
CPC .... G06F 3/1226; G06F 3/1288; G06F 3/1204; G06F 3/1267; G06F 3/1207; G06F 3/1268; G06F 3/1238

USPC ......................................................... 358/1.14
See application file for complete search history.

(56) References Cited

U.S. PATENT DOCUMENTS

| | | | | |
|---|---|---|---|---|
| 2002/0089692 | A1* | 7/2002 | Ferlitsch ................. | G06F 3/121 358/1.15 |
| 2004/0080779 | A1* | 4/2004 | Kawamoto ........... | G06F 3/1204 358/1.14 |
| 2018/0213095 | A1* | 7/2018 | Miura ................... | G06F 3/1236 |

* cited by examiner

*Primary Examiner* — Tammy Paige Goddard
*Assistant Examiner* — Darryl V Dottin
(74) *Attorney, Agent, or Firm* — James Judge

(57) ABSTRACT

An image forming system includes a user terminal, a plurality of image forming apparatuses, and a document management server. The document management server: randomly determines the image forming apparatus as the spool destination of the print job and notifies the user terminal of the image forming apparatus when the document management server receives the print job information from the user terminal for the first time; and notifies the user terminal of the previously used image forming apparatus as the spool destination of the print job when the document management server receives the print job information from the user terminal at or after the second time. The image forming apparatus that has accepted a login request from a user confirms the spool destination of the print job determined by the document management server, reads the print job from the spool destination, and executes a printing process.

2 Claims, 9 Drawing Sheets

FIG. 3A (Job List: First)

| User Identification Information | File Number | Device Identification Information (Spool Destination) | Data Size | Date and Time of Acceptance |
|---|---|---|---|---|
| Y-0001 | A001 | MFP-001 | 50MB | 20**/03/01 08:00 |
| Y-0002 | B001 | MFP-003 | 60MB | 20**/03/02 09:00 |
| Y-0003 | B002 | MFP-005 | 70MB | 20**/03/03 12:00 |
| Y-0004 | B003 | MFP-00n | 80MB | 20**/03/04 13:00 |
| ...... | ...... | ...... | ...... | ...... |

FIG. 3B (Job List: At and after Second Time)

| User Identification Information | File Number | Device Identification Information (Spool Destination) | Data Size | Date and Time of Acceptance |
|---|---|---|---|---|
| Y-0001 | A001 | MFP-002 | 50 MB | 20**/03/01 08:00 |
| Y-0002 | B001 | MFP-003 | 60 MB | 20**/03/02 09:00 |
| Y-0003 | B002 | MFP-005 | 70 MB | 20**/03/03 12:00 |
| Y-0004 | B003 | MFP-00n | 80 MB | 20**/03/04 13:00 |
| ...... | ...... | ...... | ...... | ...... |

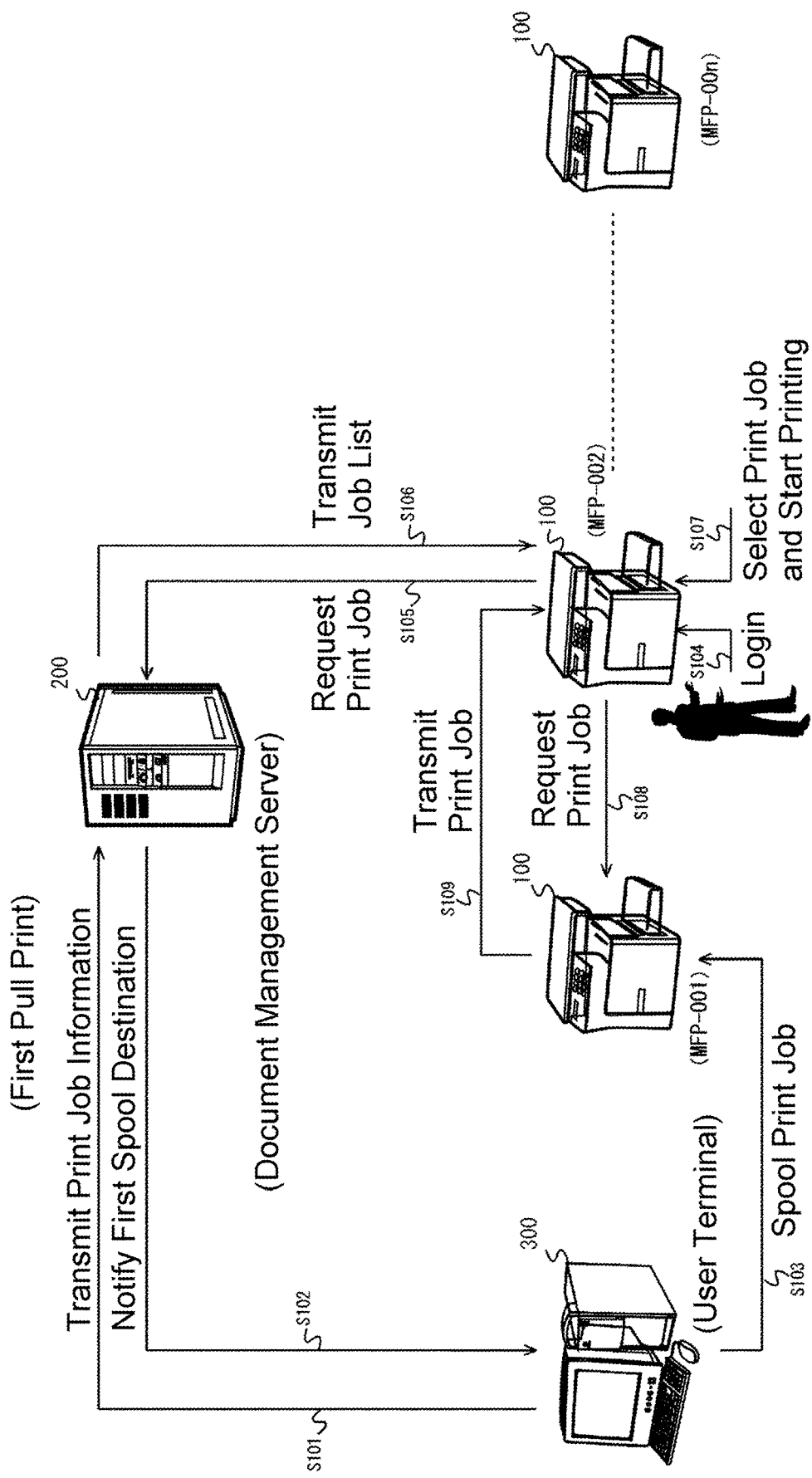

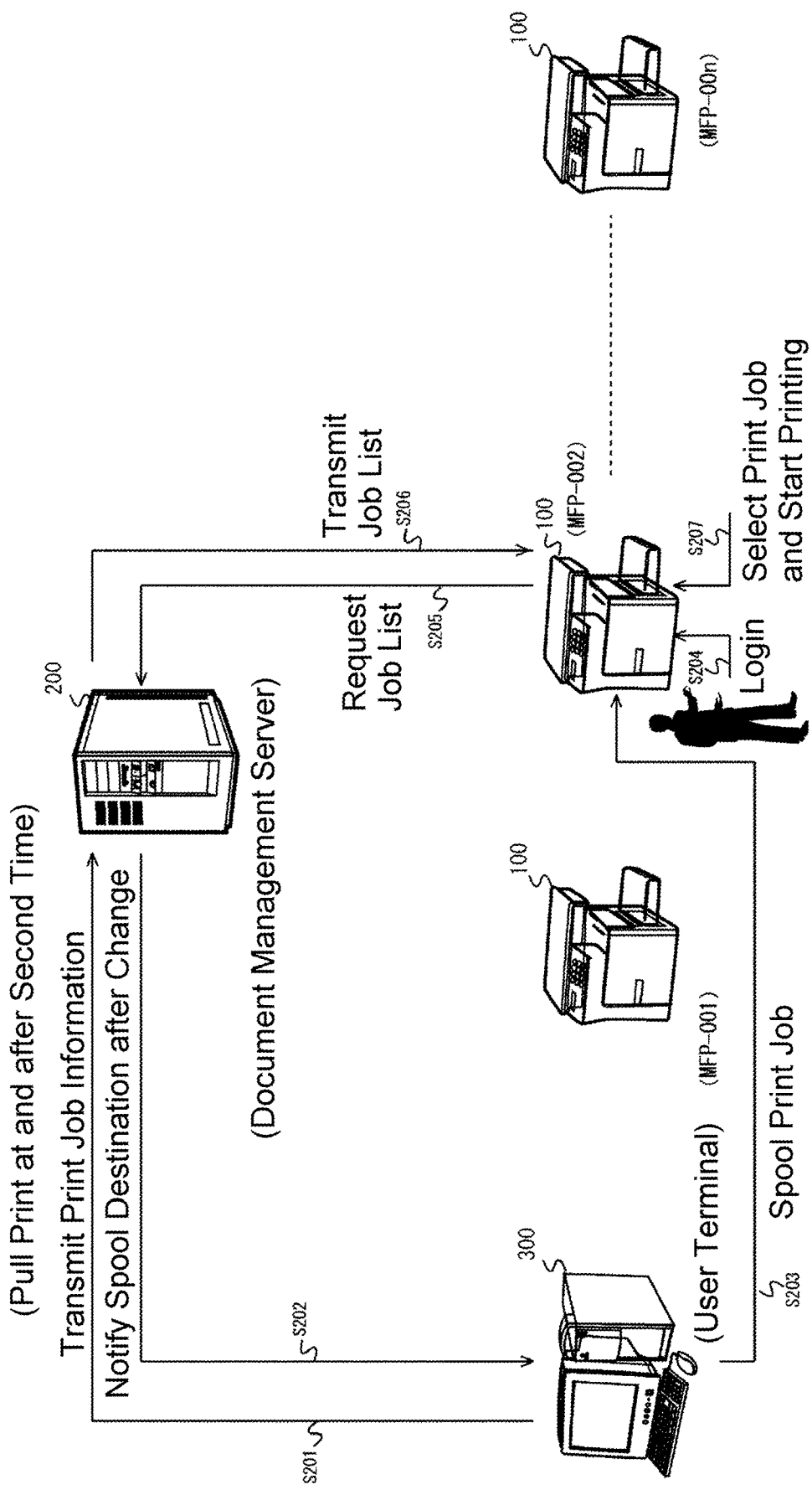

IMAGE FORMING SYSTEM AND IMAGE FORMING METHOD

INCORPORATION BY REFERENCE

This application is based upon, and claims the benefit of priority from, corresponding Japanese Patent Application No. 2018-079178 filed in the Japan Patent Office on Apr. 17, 2018, the entire contents of which are incorporated herein by reference.

BACKGROUND

Unless otherwise indicated herein, the description in this section is not prior art to the claims in this application and is not admitted to be prior art by inclusion in this section.

In a typical image forming system referred to as a pull print, spooling a print job from a user terminal in a document management server on a network ensures any image forming apparatus to designate and print the print job spooled in the document management server.

The following print management server has been proposed as the print management server related to the image forming system. That is, while the print management server holds a print job of a pull print addressed to a user terminal in one's own device, the print management server estimates an index value indicative of a magnitude of a possibility that the user terminal uses a multi-functional peripheral an output destination of the print job for each multi-functional peripheral from a location of a user, a schedule, an installation location of the multi-functional peripheral, and the like and selects the multi-functional peripherals candidate for the output destination within the maximum number of maximum devices based on the estimated index value. When any of the multi-functional peripherals causes a failure, the print management server notifies the user terminal of the failure in the multi-functional peripheral only when the multi-functional peripheral is selected as the candidate for the output destination.

SUMMARY

An image forming system according to one aspect of the disclosure includes a user terminal, a plurality of image forming apparatuses, and a document management server. The user terminal transmits a print job to be spooled and print job information. The print job information includes user information and information on the print job. The plurality of image forming apparatuses are configured to execute a printing of the print job. The document management server determines the image forming apparatus as a spool destination of the print job. The document management server: randomly determines the image forming apparatus as the spool destination of the print job and notifies the user terminal of the image forming apparatus when the document management server receives the print job information from the user terminal for the first time; and notifies the user terminal of the previously used image forming apparatus as the spool destination of the print job when the document management server receives the print job information from the user terminal at or after the second time. The user terminal transmits the print job to the spool destination indicated by the notification from the document management server. The image forming apparatus that has accepted a login request from a user confirms the spool destination of the print job determined by the document management server, reads the print job from the spool destination, and executes a printing process.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 3A describes one example of a job list managed by the document management server according to the one embodiment and illustrates the job list indicating the first registered content for any user;

FIG. 3B describes one example of the job list managed by the document management server according to the one embodiment and illustrates the job list indicating registered content at and after the second time for any user;

FIG. 4 illustrates a process of the first pull print for any user by the image forming system according to the one embodiment; and FIG. 5 illustrates a process of the pull print at and after the second time for any user by the image forming system according to the one embodiment.

DETAILED DESCRIPTION

Figure 1:
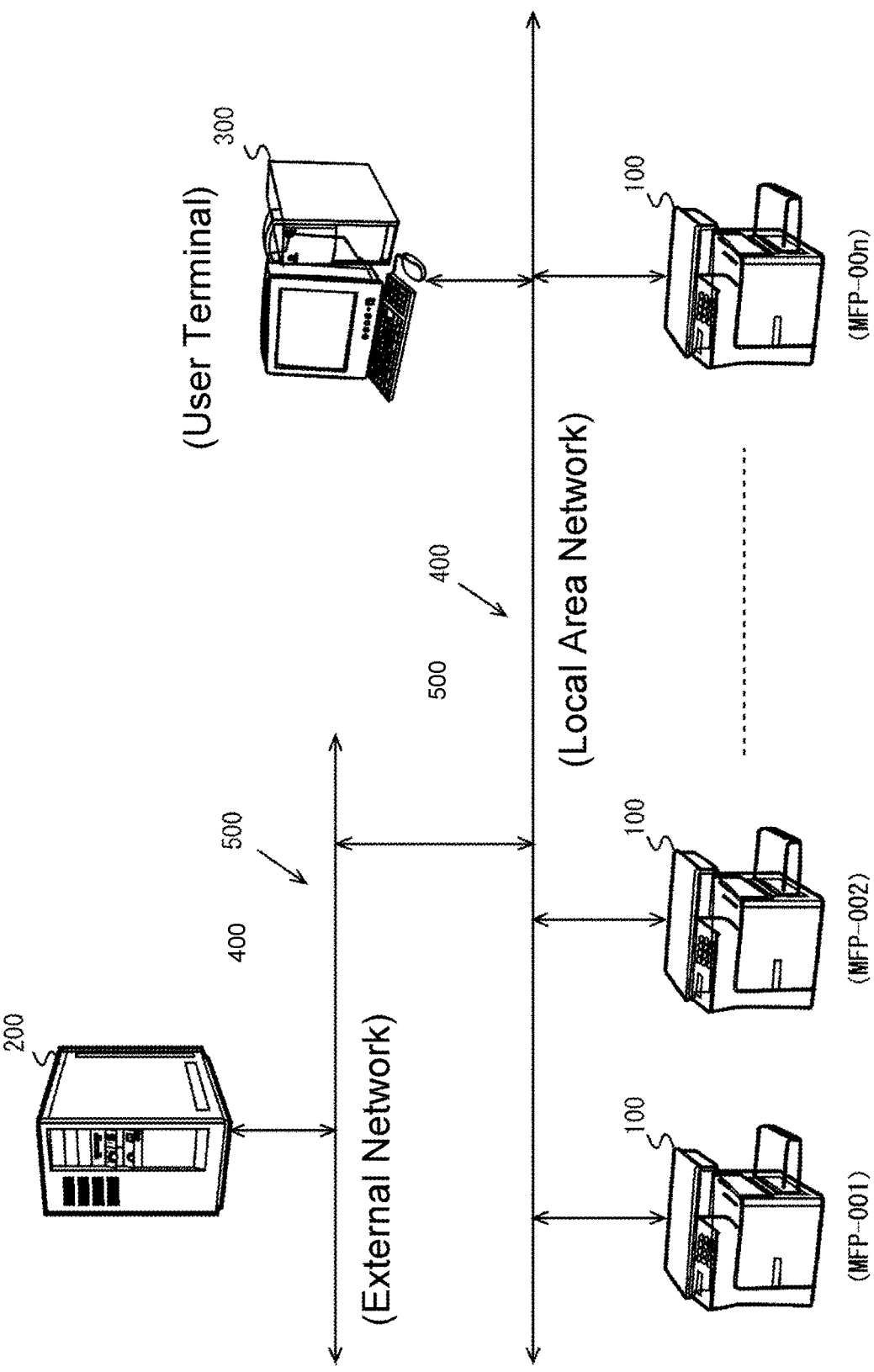
FIG. 1 illustrates a drawing describing one embodiment of an image forming system of the disclosure.
Figure 2A:
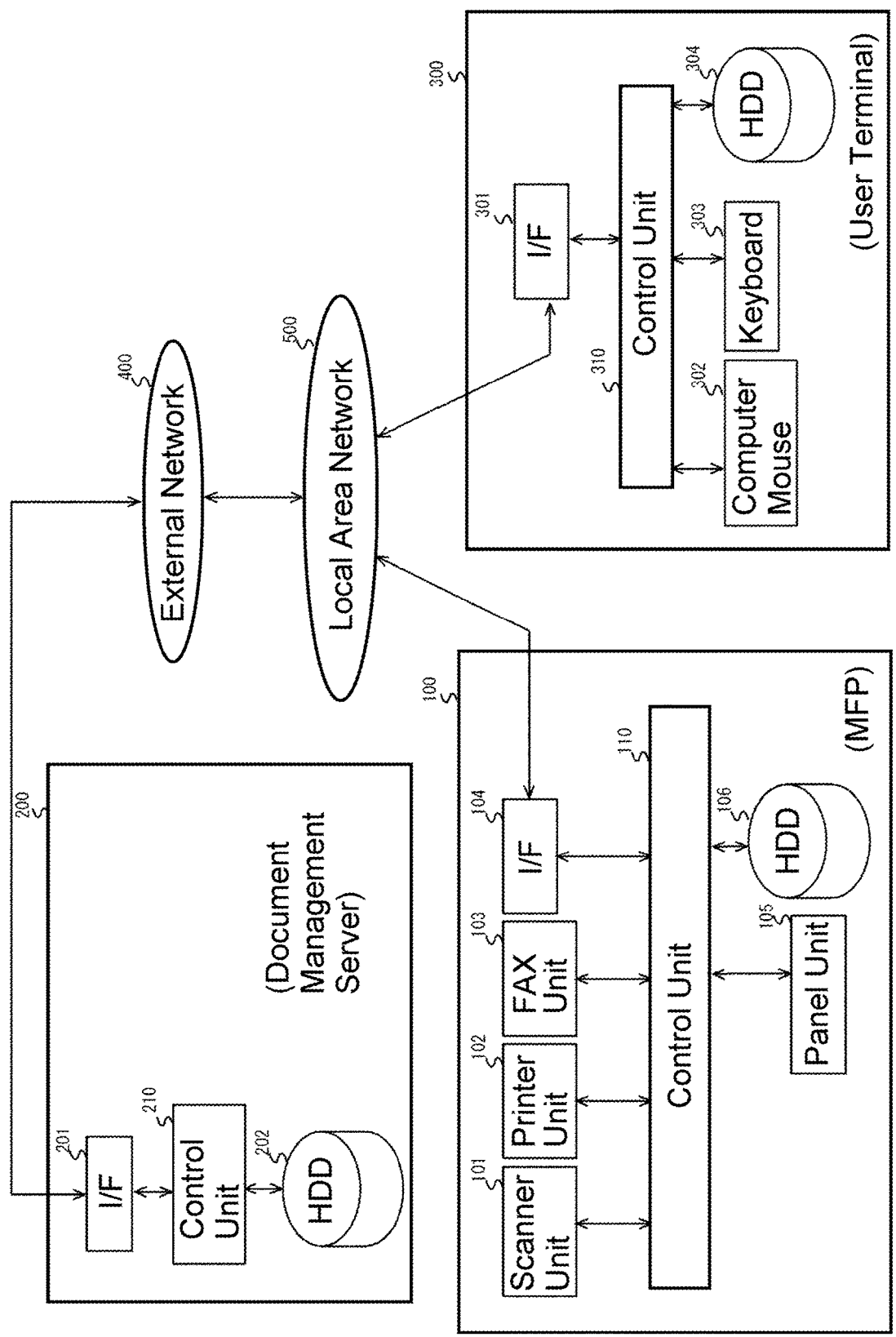
FIGS. 2A to 2D illustrate configurations of an MFP, a document management server, a user terminal, and similar devices according to the one embodiment.
Figure 2B:
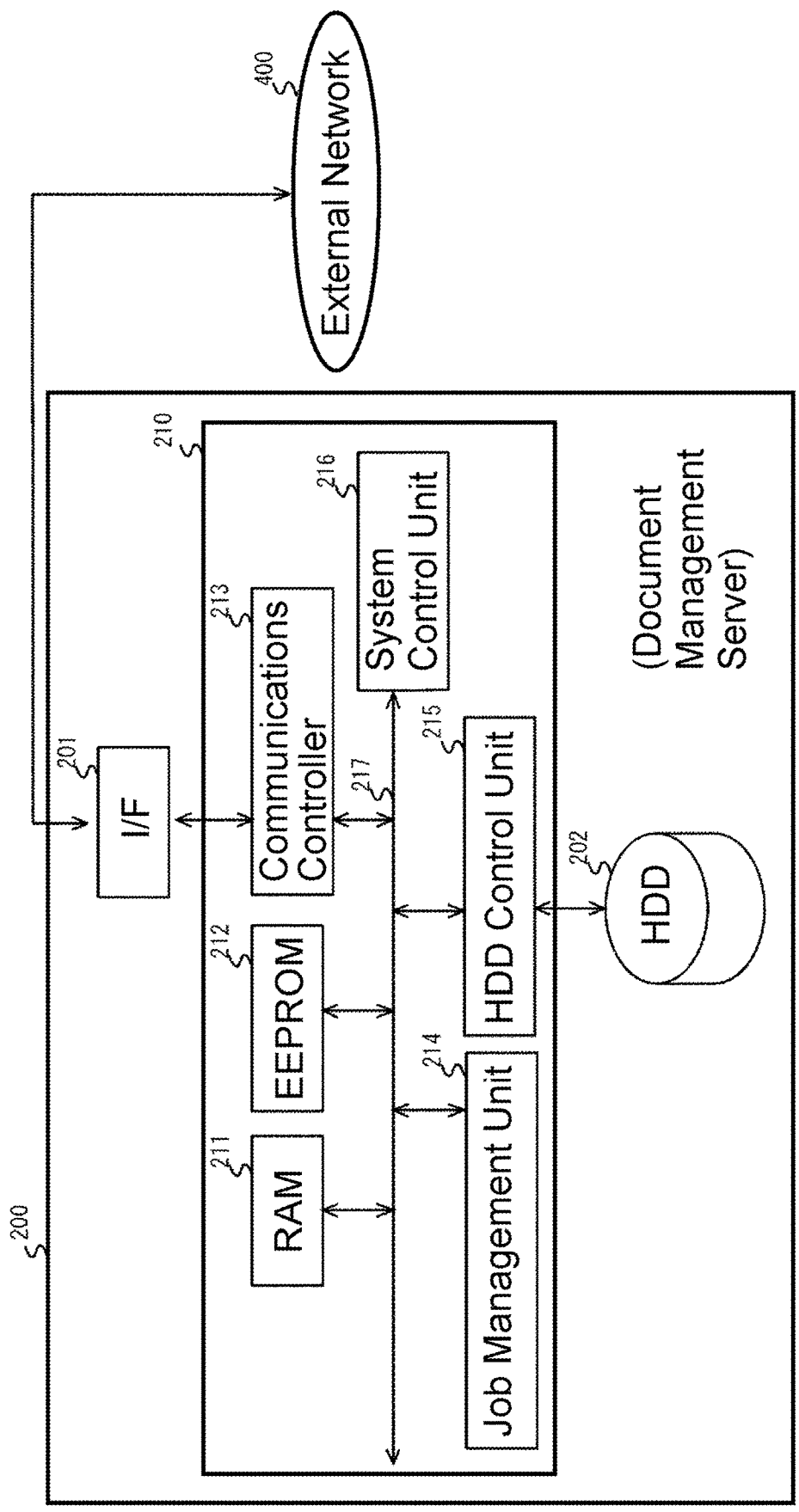
Figure 2C:
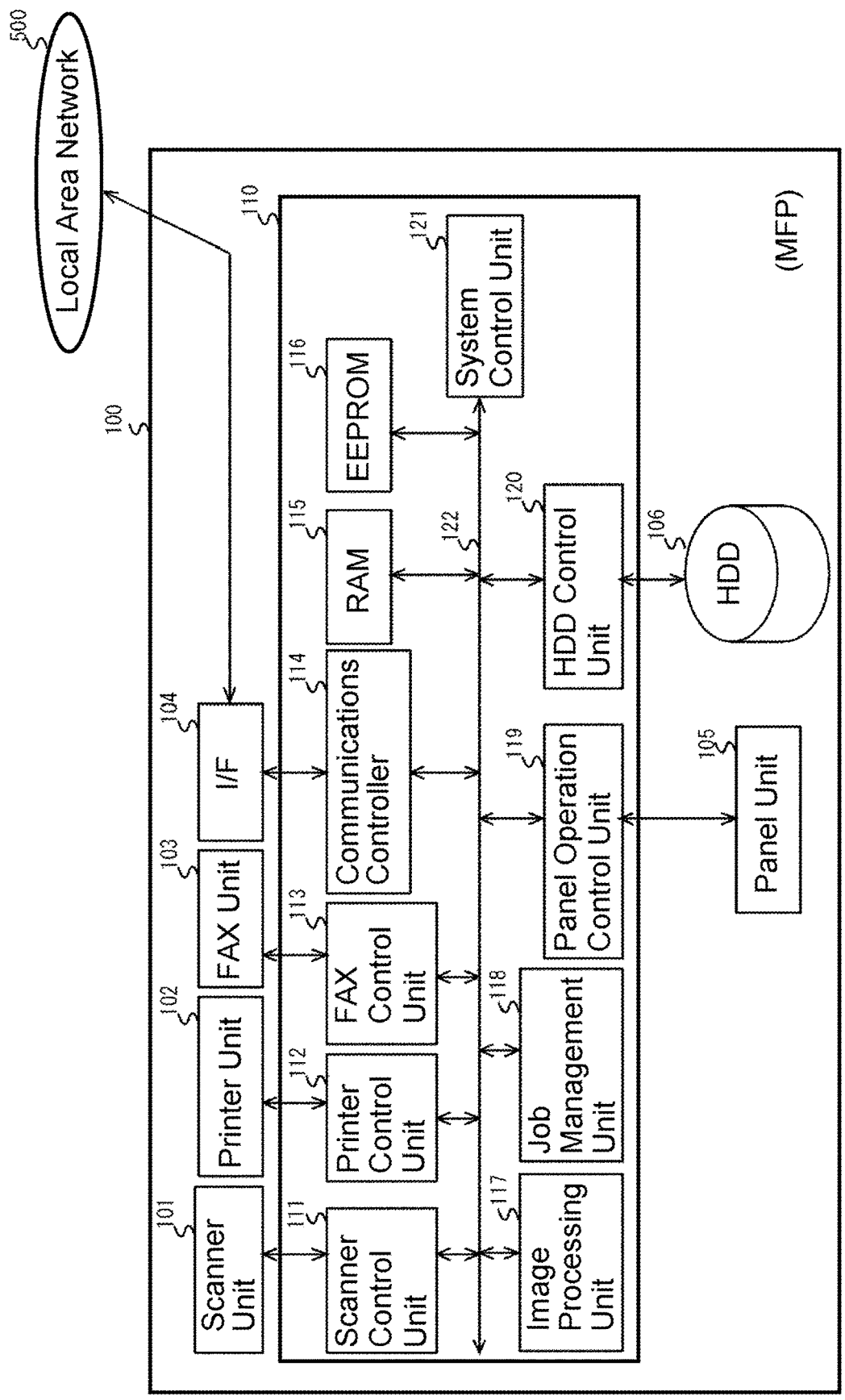
Figure 2D:
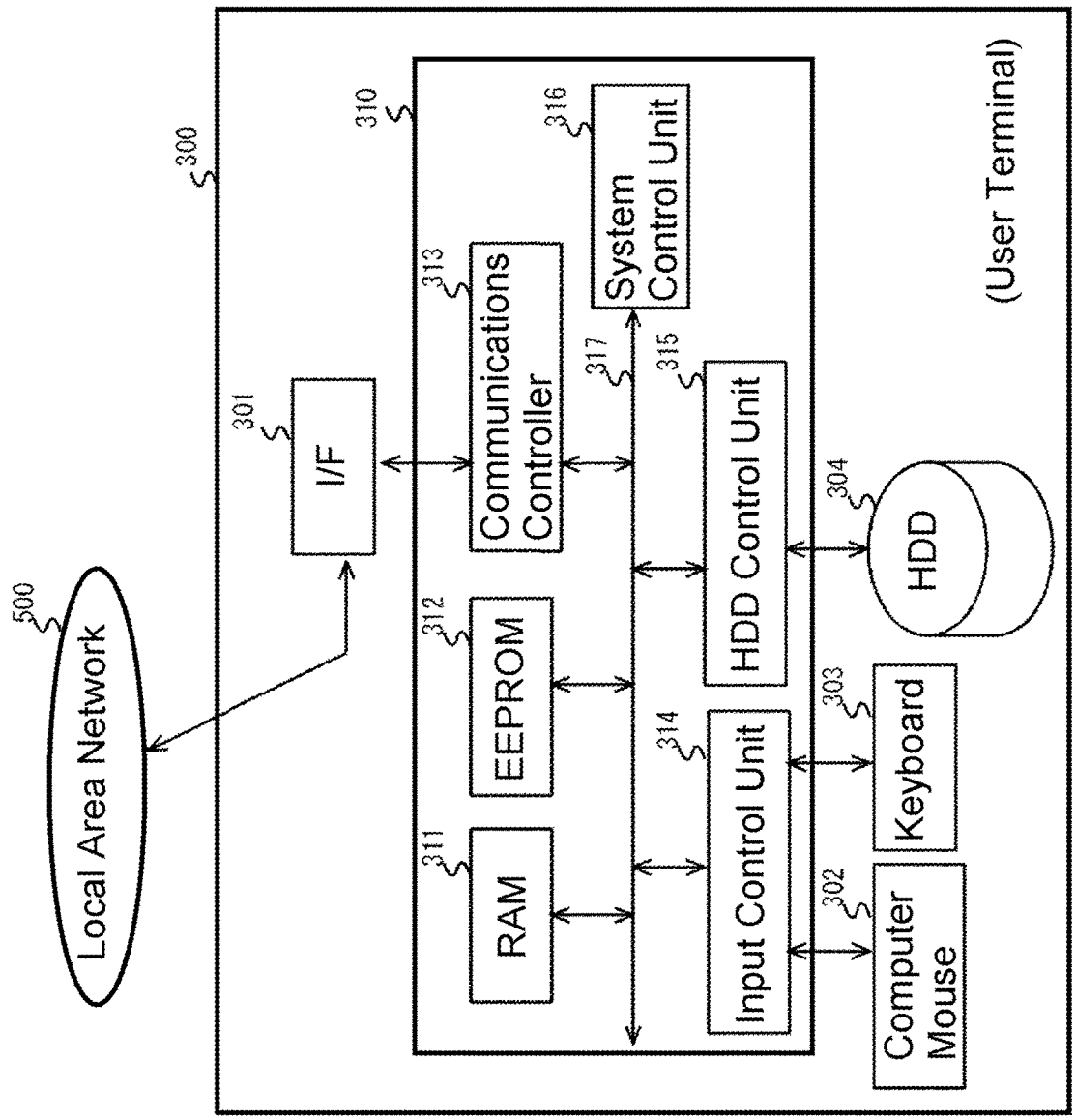

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of an image forming system of the disclosure with reference to FIG. 1 to FIG. 5. The following plurality of Multifunction Peripherals (MFPs) 100 may be identical devices or may be different type of devices. In this embodiment, all MFPs 100 are assumed to be the identical devices for convenience of explanation.

First, as illustrated in FIG. 1, the image forming system includes the MFPs 100, a document management server 200, and a user terminal 300. The MFPs 100 and the user terminal 300 are connected via a local area network 500 such as an in-house Local Area Network (LAN). The MFPs 100, the user terminal 300, and the document management server 200 are connected via the local area network 500 and an external network 400 such as the Internet. The MFPs 100 are, for example, composite peripheral devices where functions such as a printing function, a copy function, a FAX function, and a data transmission/reception function via the network are incorporated and equipped as a standard. The MFP 100 each contain device identification information 603 (see FIG. 3A or FIG. 3B described later) indicated by, for example, MFP-001, MFP-002, . . . MFP-00n. Although the details will be described later, the document management server 200 associates the device identification information 603 with user identification information 601 (see FIG. 3A or FIG. 3B described later) and manages spool destinations of the print jobs from the user terminal 300. The document management server 200 may be a shared server shared by a plurality of users or may be a cloud server.

The user terminal 300 is not limited to one as illustrated in the drawing and may be plural. The user terminal 300 may be a portable terminal such as a laptop personal computer, a tablet, and a smart phone. Although the details will be described later, when the user terminal 300 transmits information on the print job (hereinafter referred to as print job information) to the document management server 200, the user terminal 300 receives a notification of the MFP 100 as the spool destination set by the document management server 200 and spools the print job to the spool destination. The print job information includes the user identification information 601, a file number 602, and similar information illustrated in FIG. 3A and FIG. 3B described later.

Next, the following describes configurations of the MFP 100, the document management server 200, the user terminal 300, and similar devices with reference to FIGS. 2A to 2D. The MFP 100 includes a control unit 110 that controls operations of a scanner unit 101, a printer unit 102, a Facsimile (FAX) unit 103, an interface (I/F) 104, a panel unit 105, and a Hard Disk Drive (HDD) 106.

The scanner unit 101 is a device that converts an image on a document (not illustrated) read by an image sensor (not illustrated) into digital image data and inputs the image data to the control unit 110. The printer unit 102 is a device that prints the image on a paper sheet (not illustrated) based on print data output from the control unit 110. The FAX unit 103 is a device that transmits the data output from the control unit 110 to a facsimile on the opposite party through a telephone line, or receives data from the facsimile on the opposite party and inputs the data to the control unit 110.

The I/F 104 is in charge of communications with the other MFPs 100 and the user terminal 300 via the local area network 500. The I/F 104 is also in charge of communications with the document management server 200 via the local area network 500 and the external network 400. The I/F 104 may be in charge of communications with, for example, a content server and a web server (not illustrated). The panel unit 105 is a device such as a touch panel that executes displays for the printing function, the copy function, the FAX function, the data transmission/reception function via the local area network 500 and the external network 400, various settings, and the like. The HDD 106 is a storage device that stores an application program or similar data to provide the various functions of the MFPs 100. The HDD 106 includes a user box that stores, for example, the print job received from the user terminal 300.

The control unit 110 is a processor that controls the entire operation of the MFPs 100 through the execution of an application program such as an authentication program, an image forming program, a control program, and similar program. The control unit 110 includes a scanner control unit 111, a printer control unit 112, a FAX control unit 113, a communications controller 114, a Random Access Memory (RAM) 115, an Electrically Erasable Programmable Read-Only Memory (EEPROM) 116, an image processing unit 117, a job management unit 118, a panel operation control unit 119, a HDD control unit 120, and a system control unit 121. These units are connected to a data bus 122.

The scanner control unit 111 controls a reading operation by the scanner unit 101. The printer control unit 112 controls a printing operation by the printer unit 102. The FAX control unit 113 controls the transmission and reception operations of the data by the FAX unit 103. The communications controller 114 controls the transmission and reception of the data and the like via the local area network 500 and the external network 400 via the I/F 104.

The RAM 115 is a work memory to execute the programs. The RAM 115 stores the print data image-processed by the image processing unit 117. The EEPROM 116 stores control programs that execute, for example, operation check of the respective units. The EEPROM 116 stores firmware including version data to operate the scanner unit 101, the printer unit 102, the FAX unit 103, the interface (I/F) 104, the panel unit 105, the HDD 106, and similar unit.

The image processing unit 117 executes an image process on (rasterizes) the image data read by the scanner unit 101. The image processing unit 117 executes the image process on (rasterizes) print target data registered in the user box in the HDD 106. The system control unit 121 causes the RAM 115 to once store the print data image-processed by the image processing unit 117.

The job management unit 118, for example, manages the print job or similar data stored in the user box in the HDD 106. The panel operation control unit 119 controls a display operation by the panel unit 105. The panel operation control unit 119 accepts, for example, instructions of a start of the printing, copy, FAX, data transmission and reception via the local area network 500 and external network 400, or the like, a login request, and a start of the print job or the like via the panel unit 105.

The system control unit 121 controls a collaborative operation by the respective units or similar operation. When the copy, the print, or similar operation is selected via the panel unit 105, the system control unit 121 controls the reading of the document by the scanner unit 101 and the printing to the paper sheet by the printer unit 102 via the scanner control unit 111 and the printer control unit 112. Although the details will be described later, when the panel operation control unit 119 accepts the login request and when a user authentication is successful, the system control unit 121 requests transmission of the job list 600 illustrated in FIG. 3A or FIG. 3B described later to the document management server 200. When the system control unit 121 receives the job list 600, the system control unit 121 causes the panel unit 105 to display the received job list 600. When the panel operation control unit 119 accepts the selection of the print job from the job list 600, the system control unit 121 reads the print job based on the spool destination of the selected print job indicated by the job list 600 and instructs the printing.

The document management server 200 includes a control unit 210 that controls an I/F 201 and a HDD 202. The I/F 201 is connected to the MFPs 100 and the user terminal 300 via the external network 400 and the local area network 500. The HDD 202 stores the above-described print job information received from the user terminal 300, the job list 600 illustrated in FIG. 3A or FIG. 3B described later based on the usage of the MFPs 100 by the user and the like, and similar data. Although the details will be described later, the MFP 100 used by the user can be confirmed based on the user identification information 601 included in a request from the MFP 100 for the job list 600.

The control unit 210 is a processor that executes the control program or similar program to control the entire operation of the document management server 200. The control unit 210 includes a RAM 211, an EEPROM 212, a communications controller 213, a job management unit 214, a HDD control unit 215, and a system control unit 216. These units are connected to a data bus 217.

The RAM 211 is a work memory to execute the programs. The EEPROM 212 stores the control programs to execute the operation check of the respective units and similar operation. The communications controller 213 controls the transmission and reception of the data and the like, for example, via the external network 400 and the local area network 500 via the I/F 201. The communications controller 213 receives the above-described print job information and similar information from the user terminal 300. The communications controller 213 transmits the job list 600 and or similar data according to the request from the MFP 100. The job management unit 214 manages the job list 600 in FIG. 3A or FIG. 3B described later.

When the system control unit 216 receives the print job information from the user terminal 300 for the first time via the communications controller 213, the system control unit 216 instructs the job management unit 214 to add the user identification information 601 to the job list 600 of FIG. 3A described later. The system control unit 216 refers to the job list 600 of FIG. 3A described later, and when the user identification information 601 (see the job list 600 of FIG. 3A described later) and similar information included in the print job information from the user terminal 300 are not registered, the system control unit 216 randomly determines the spool destination of the print job. Further, the system control unit 216 refers to the job list 600, and based on the user identification information 601 (see the job list 600 of FIG. 3A described later) and the device identification information 603 (see the job list 600 of FIG. 3A described later) included in the request from any of the MFPs 100 for the job list 60, the system control unit 216 causes the job management unit 214 to change the randomly determined device identification information 603 to the device identification information 603 included in the request from the MFP 100 for the job list 600. That is, when the randomly determined device identification information 603 is, for example, MFP-001, and the device identification information 603 included the request transmitted from the MFP 100 for the job list 600 in association with the use of the MFP 100 is, for example, MFP-002, the system control unit 216 causes the job management unit 214 to change the device identification information 603 (see the job list 600 of FIG. 3B described later) from MFP-001 to MFP-002. Thus, the job management unit 214 changes the content of the device identification information 603 in the job list 600. Note that when the device identification information 603 included in the request for the job list 600 is, for example, MFP-002, and a storage device in the MFP 100 indicated by MFP-002 has a small capacity (such as an insufficient free space to store the print job), the system control unit 216 does not instruct the job management unit 214 to change the device identification information 603 from MFP-001 to MFP-002.

The user terminal 300 includes a control unit 310 that controls an I/F 301, a computer mouse 302, a keyboard 303, and a HDD 304. The I/F 301 is connected to the MFP 100 via the local area network 500. Additionally, the I/F 301 is connected to the document management server 200 via the local area network 500 and the external network 400. The computer mouse 302 is operated to instruct an input position of a character or similar operation. The keyboard 303 is operated to input the character or similar data. The HDD 304 stores the print job and the like.

The control unit 310 is a processor that executes the control program or similar program to control the entire operation of the user terminal 300. The control unit 310 includes a RAM 311, an EEPROM 312, a communications controller 313, an input control unit 314, a HDD control unit 315, and a system control unit 316. These units are connected to a data bus 317.

The RAM 311 is a work memory to execute the programs. The EEPROM 312 stores control programs that execute, for example, operation check of the respective units. The communications controller 313 controls the transmission and reception of the data and the like, for example, via the external network 400 and the local area network 500 via the I/F 301. The communications controller 313 receives the notification of the spool destination of the above-described job from the document management server 200. The input control unit 314 controls an input operation with the computer mouse 302 and the keyboard 303.

The system control unit 316 transmits the print job information on the print job to be spooled and is input with the keyboard 303 or similar device to the document management server 200 via the communications controller 313. When the system control unit 316 receives the notification of the above-described spool destination of the print job from the document management server 200, the system control unit 316 reads the print job stored in the HDD 304 and transmits the print job to the MFP 100 designated as the spool destination via the communications controller 313.

Next, the following describes one example of the job list 600 managed by the job management unit 214 in the document management server 200 with reference to FIG. 3A and FIG. 3B. First, FIG. 3A illustrates the first registered content for any user. The following describes the user identification information 601 of any user as Y-0001. With the job list 600, for example, the user identification information 601, the file number 602, the device identification information 603, a data size 604, and a date and time of acceptance 605 are registered. The user identification information 601 identifies the user using the MFP 100 that can be expressed by a character string such as Y-0001 and Y-0002. For example, the user identification information 601 may be assigned by an administrator who manages the document management server 200 or may be designated by the user. The file number 602 indicates an identification number of the print data included in the print job information from the user terminal 300. This file number 602 is set by the user and a length of the character string and the like may be freely set. The device identification information 603 identifies the respective MFPs 100 and is referred to determine the spool destination of the print job according to a usage situation of the user and notify the user terminal 300 of the spool destination. The data size 604 indicates the size of the print job. The date and time of acceptance 605 indicates date and time when the information on the job is accepted from the user terminal 300.

Next, FIG. 3B illustrates the registered content for any user at and after the second time. That is, for example, the device identification information 603 randomly determined and associated with the user identification information 601 (Y-0001) is assumed to be, for example, MFP-001. Here, it is assumed that the user with the user identification information 601 of (Y-0001) logs in the MFP 100 with MFP-002 to use the MFP 100 with the device identification information 603 of, for example, MFP-002. At this time, to request the transmission of the job list 600 from the MFP 100 that has been logged in to the document management server 200, the device identification information 603 of the MFP 100 and the user identification information 601 (Y-0001) input at the login are transmitted to the document management server 200. Here, the system control unit 216 in the document management server 200 causes the job management unit 214 to change the device identification information 603 from MFP-001 to MFP-002 as indicated by the enclosure with the dotted line in FIG. 3B. At this time, the job management unit 214 changes the content of the device identification information 603 in the job list 600. Note that when the storage device in the MFP 100 indicated by the device identification information 603 included in the request for transmission of the job list 600 has a small capacity (such as an insufficient free space to store the print job), the system control unit 216 does not instruct the job management unit 214 to change the device identification information 603.

Next, the following describes a process of the first pull print for any user by the image forming system of FIG. 1 with reference to FIG. 4. The following describes the user indicated as the user identification information 601 (Y-0001) as any user. The description is given assuming that the following print job information includes the user identification information 601 (Y-0001), the file number 602, and similar information as described above.

Step S101

The system control unit 316 in the user terminal 300 transmits the print job information to the document management server 200.

In this case, when the user identification information 601 (Y-0001), the file number 602 (A001) of the job to be spooled, and similar information are input with the keyboard 303 or similar device, the system control unit 316 transmits the user identification information 601, the file number 602, and similar information as the print job information to the document management server 200 via the communications controller 313.

Step S102

The system control unit 216 in the document management server 200 determines and notifies the spool destination of the print job.

In this case, the system control unit 216 confirms whether the user identification information 601 (Y-0001) included in the print job information is registered in, for example, the HDD 202. When the user identification information 601 (Y-0001) is registered in the HDD 202, the system control unit 216 determines that the user authentication is successful. Subsequently, the system control unit 216 refers to the job list 600 of FIG. 3A managed by the job management unit 214 and confirms whether the user identification information 601 (Y-0001) is registered.

When the user identification information 601 (Y-0001) is not registered with the job list 600 of FIG. 3A, the system control unit 216 instructs the job management unit 214 to register the user identification information 601 (Y-0001) with the job list 600 of FIG. 3A. When the user identification information 601 (Y-0001) is not registered with the job list 600, the system control unit 216 randomly determines the spool destination of the print job and instructs the job management unit 214 to register the spool destination with the job list 600.

Additionally, the system control unit 216 notifies the user terminal 300 of the randomly determined spool destination of the print job via the communications controller 213.

At this time, the job management unit 214 registers the user identification information 601 (Y-0001), the file number 602 (A001), and the device identification information 603 (MP-0001), which is the randomly determined spool destination of the print job, with the job list 600. Here, the spool destination of the print job randomly determined by the system control unit 216 is assumed as, for example, MP-0001.

Step S103

The system control unit 316 in the user terminal 300 spools the print job.

In this case, the system control unit 316 transmits the print job to the MFP 100 registered with the device identification information 603 (MP-0001) as the spool destination of the print job indicated by the notification received from the document management server 200 via the communications controller 313.

Step S104

The system control unit 121 in the MFP 100 accepts the login of the user via the panel unit 105.

The MFP 100 that has accepted the login of the user is assumed as, for example, MP-0002. The system control unit 121 in the MFP 100 with MP-0002 is assumed to accept the user identification information 601 (Y-0001) required for the login via the panel unit 105.

Step S105

The system control unit 121 in the MFP 100 with MP-0002 requests the transmission of the job list 600 from the document management server 200.

In this case, the system control unit 121 in the MFP 100 with MP-0002 transmits the user identification information 601 (Y-0001) and the device identification information 603 (MP-0002) accepted via the panel unit 105 to the document management server 200 via the communications controller 114.

Step S106

The system control unit 216 in the document management server 200 transmits the job list 600 of FIG. 3A.

In this case, the system control unit 216 refers to the job list 600 of FIG. 3A managed by the job management unit 214 and transmits the content corresponding to the user identification information 601 (Y-0001) in the job list 600 to the MFP 100 with MP-0002 via the communications controller 213.

Further, after the system control unit 216 transmits the content corresponding to the user identification information 601 (Y-0001) in the job list 600 to the MFP 100 with MP-0002, the system control unit 216 instructs the job management unit 214 to change the spool destination of the print job corresponding to the user identification information 601 (Y-0001). Here, the system control unit 216 causes the job management unit 214 to change the spool destination corresponding to the user identification information 601 (Y-0001) included in the request from the MFP 100 for transmission of the job list 600 with MP-0002 to MP-0002, which is similarly included in the request for transmission of the job list 600.

At this time, as illustrated in FIG. 3B, the job management unit 214 changes the device identification information 603 corresponding to the user identification information 601 (Y-0001) in the job list 600 from MP-0001 to MP-0002.

Step S107

The system control unit 121 in the MFP 100 with MP-0002 accepts the selection of the print job and the print start.

In this case, the system control unit 121 causes the panel unit 105 to display the content corresponding to the user identification information 601 (Y-0001) in the job list 600 received from the document management server 200 via the panel operation control unit 119.

Here, the system control unit 121 accepts the selection of the file number 602 (A001) and the print start via the panel unit 105.

Step S108

The system control unit 121 in the MFP 100 with MP-0002 requests transfer of the print job of the file number 602 (A001) from the MFP 100 with MP-0001.

In this case, when the file number 602 (A001) is selected via the panel unit 105, the system control unit 121 in the MFP 100 with MP-0002 confirms that the spool destination of the print job is MP-0001 from the content corresponding to the user identification information 601 (Y-0001) in the job list 600 and requests the transfer of the print job of the file number 602 (A001) from the MFP 100 with MP-0001 via the communications controller 114.

Step S109

The system control unit 121 in the MFP 100 with MP-0001 transmits the print job of the file number 602 (A001) to the MFP 100 with MP-0002.

In this case, after the system control unit 121 in the MFP 100 with MP-0001 reads and transmits the print job of the file number 602 (A001) stored in the HDD 106, the system control unit 121 deletes the print job of the file number 602 (A001) stored in the HDD 106.

Afterward, the system control unit 121 in the MFP 100 with MP-0002 causes the HDD 304 to store the print job received from the MFP 100 with MP-0001 and also instructs the image processing unit 117 and the printer control unit 112 to start printing of the print job of the file number 602 (A001).

Next, the following describes a process of the pull print at and after the second time for any user by the image forming system of FIG. 1 with reference to FIG. 5. The following describes the user indicated as the user identification information 601 (Y-0001) as any user similarly to the above. The description is given assuming that the following print job information includes the user identification information 601 (Y-0001), the file number 602, and similar information as described above.

Step S201

The system control unit 316 in the user terminal 300 transmits the print job information to the document management server 200.

In this case, when the user identification information 601 (Y-0001), the file number 602 (for example, A001) of the print job to be spooled, and similar information are input with the keyboard 303 or similar device, the system control unit 316 transmits the user identification information 601, the file number 602, and similar information as the print job information to the document management server 200 via the communications controller 313.

Step S202

The system control unit 216 in the document management server 200 notifies the spool destination after changing the print job.

In this case, the system control unit 216 confirms whether the user identification information 601 (Y-0001) included in the print job information is registered in, for example, the HDD 202. When the user identification information 601 (Y-0001) is registered in the HDD 202, the system control unit 216 determines that the user authentication is successful. Subsequently, the system control unit 216 refers to the job list 600 of FIG. 3B managed by the job management unit 214 and confirms whether the user identification information 601 (Y-0001) is registered.

When the user identification information 601 (Y-0001) is registered with the job list 600 of FIG. 3B, the system control unit 216 confirms that the device identification information 603 as the spool destination corresponding to the user identification information 601 (Y-0001) is MP-0002 and notifies the user terminal 300 of the spool destination after changing the print job via the communications controller 213.

When the user identification information 601 (Y-0001) is not registered with the job list 600 of FIG. 3B, the system control unit 216 instructs the job management unit 214 to register the user identification information 601 (Y-0001) with the job list 600 similarly to the above. When the user identification information 601 (Y-0001) is not registered with the job list 600, the system control unit 216 randomly determines the spool destination of the print job and instructs the job management unit 214 to register the spool destination with the job list 600 of FIG. 3B similarly to the above.

Step S203

The system control unit 316 in the user terminal 300 spools the print job.

In this case, the system control unit 316 transmits the print job to the spool destination of the print job (MP-0002) indicated by the notification received from the document management server 200 via the communications controller 313.

Step S204

The system control unit 121 in the MFP 100 accepts the login of the user via the panel unit 105.

The MFP 100 that has accepted the login of the user is assumed as, for example, MP-0002. The system control unit 121 in the MFP 100 with MP-0002 is assumed to accept the user identification information 601 (Y-0001) required for the login via the panel unit 105.

Step S205

The system control unit 121 in the MFP 100 with MP-0002 requests the transmission of the job list 600 from the document management server 200.

In this case, the system control unit 121 in the MFP 100 with MP-0002 transmits the user identification information 601 (Y-0001) and the device identification information 603 of the MFP 100 (MP-0002) accepted via the panel unit 105 to the document management server 200 via the communications controller 114.

Step S206

The system control unit 216 in the document management server 200 transmits the job list 600 of FIG. 3B.

In this case, the system control unit 216 refers to the job list 600 of FIG. 3B managed by the job management unit 214 and transmits the content corresponding to the user identification information 601 (Y-0001) in the job list 600 to the MFP 100 with MP-0002 via the communications controller 213.

Step S207

The system control unit 121 in the MFP 100 with MP-0002 accepts the selection of the print job and the print start.

In this case, the system control unit 121 causes the panel unit 105 to display the content corresponding to the user identification information 601 (Y-0001) in the job list 600 received from the document management server 200 via the panel operation control unit 119.

Here, the system control unit 121 accepts the selection of the file number 602 (A001) and the print start via the panel unit 105. When the system control unit 121 confirms that the print job of the file number 602 (A001) to be printed in the job list 600 received from the document management server 200 is stored in its own HDD 106, the system control unit 121 reads the data of the print job from the HDD 106 and instructs the image processing unit 117 and the printer control unit 112 to start printing of the print job of the file number 602 (A001).

Thus, in this embodiment, the user terminal 300 transmits the print job to be spooled, the print job information including the information on the user information and the print job, any of the plurality of MFPs 100 (image forming apparatuses) executes the printing of the print job, and the document management server 200 determines the MFP 100 (image forming apparatus) as the spool destination of the print job. When the print job information from the user terminal 300 is received for the first time, the document management server 200 randomly determines the MFP 100 (image forming apparatus) as the spool destination of the print job and notifies the user terminal 300 of the MFP 100. When the print job information is received from the user terminal 300 at and after the second time, the document management server 200 notifies the user terminal 300 of the MFP 100 (image forming apparatus) previously used as the spool destination of the print job, the user terminal 300 transmits the print job to the spool destination indicated by the notification from the document management server 200, and the MFP 100 (image forming apparatus) that has accepted the login request from the user confirms the spool destination of the print job determined by the document management server 200, reads the print job from the spool destination, and executes the printing process.

Thus, the document management server 200 determines the image forming apparatus previously used by the user as the spool destination of the print job from the user terminal 300; therefore, the print job can be spooled to the MFP 100 (image forming apparatus) whose usage frequency is high, thereby ensuring reducing an increase in time until the printing is completed. The document management server 200 automatically determines the MFP 100 (image forming apparatus) previously used by the user as the spool destination of the print job from the user terminal 300, and this eliminates the need for the administrator to execute management regarding settings for each user of the spool destination of the print job. Thus, the increase in time until the completion of the printing can be reduced, and this eliminates the need for the administrator to execute the management regarding the settings for each user of the spool destination of the print job, thereby ensuring reducing a load regarding the settings for each user of the spool destination of the print job on the administrator while a convenience for the user is maintained.

When the MFP 100 logged in by the user at Step S104 illustrated in FIG. 4 is the MFP 100 with MFP-001 as the spool destination of the print job, the processes may be executed similar to Steps S205 to S207 illustrated in FIG. 5.

When the MFP 100 logged in by the user at Step S204 illustrated in FIG. 5 is not the MFP 100 with MFP-002 as the spool destination of the print job, the processes may be executed similar to Steps S105 to S108 illustrated in FIG. 4.

Exemplary Embodiment of the Disclosure

An image forming system of the disclosure includes a user terminal, a plurality of image forming apparatuses, and a document management server. The user terminal transmits a print job to be spooled and print job information. The print job information includes user information and information on the print job. The plurality of image forming apparatuses are configured to execute a printing of the print job. The document management server determines the image forming apparatus as a spool destination of the print job. The document management server: randomly determines the image forming apparatus as the spool destination of the print job and notifies the user terminal of the image forming apparatus when the document management server receives the print job information from the user terminal for the first time; and notifies the user terminal of the previously used image forming apparatus as the spool destination of the print job when the document management server receives the print job information from the user terminal at or after the second time. The user terminal transmits the print job to the spool destination indicated by the notification from the document management server. The image forming apparatus that has accepted a login request from a user confirms the spool destination of the print job determined by the document management server, reads the print job from the spool destination, and executes a printing process.

Further, the document management server manages the spool destination of the print job associated with the user information in a job list. The document management server registers the user information with the job list when the document management server receives the print job information for the first time and further associates first device identification information with the user information and registers the first device identification information. The first device identification information indicates the image forming apparatus as the randomly determined spool destination. The document management server changes the first device identification information to second device identification information when the document management server receives the print job information from the user terminal at or after the second time. The second device identification information indicates the previously used image forming apparatus.

Further, the image forming apparatus that has accepted the login request from the user requests a confirmation of the spool destination of the print job corresponding to the user information input at the login request from the document management server.

An image forming method of the disclosure includes: a step of transmitting a print job to be spooled and print job information by a user terminal, the print job information including user information and information on the print job; a step of executing a printing of the print job by any of a plurality of image forming apparatuses; and a step of determining the image forming apparatus as a spool destination of the print job by a document management server. The document management server: randomly determines the image forming apparatus as the spool destination of the print job and notifies the user terminal of the image forming apparatus when the document management server receives the print job information from the user terminal for the first time; and notifies the user terminal of the previously used image forming apparatus as the spool destination of the print job when the document management server receives the print job information from the user terminal at or after the second time. The user terminal transmits the print job to the spool destination indicated by the notification from the document management server. The image forming apparatus that has accepted a login request from a user confirms the spool destination of the print job determined by the document management server, reads the print job from the spool destination, and executes a printing process.

With the image forming system and the image forming method of the disclosure, the print job to be spooled and the print job information are transmitted by the user terminal. The print job information includes the user information and the information on the print job. The printing of the print job is executed by any of the plurality of image forming apparatuses. The document management server determines the image forming apparatus as the spool destination of the print job. The document management server: randomly determines the image forming apparatus as the spool destination of the print job and notifies the user terminal of the image forming apparatus when the document management server receives the print job information from the user terminal for the first time; and notifies the user terminal of the previously used image forming apparatus as the spool destination of the print job when the document management server receives the print job information from the user terminal at or after the second time. The user terminal transmits the print job to the spool destination indicated by the notification from the document management server. The image forming apparatus that has accepted the login request from the user confirms the spool destination of the print job determined by the document management server, reads the print job from the spool destination, and executes the printing process.

Thus, the document management server determines the image forming apparatus previously used by the user as the spool destination of the print job from the user terminal; therefore, the print job can be spooled to the image forming apparatus whose usage frequency is high, thereby ensuring reducing an increase in time until the printing is completed. The document management server automatically determines the image forming apparatus previously used by the user as the spool destination of the print job from the user terminal, and this eliminates the need for the administrator to execute management regarding settings for each user of the spool destination of the print job.

Effects of the Disclosure

The image forming system and the image forming method of the disclosure can reduce the increase in time until the completion of the printing and eliminate the need for the administrator to execute the management regarding the settings for each user of the spool destination of the print job, thereby ensuring reducing a load regarding the settings for each user of the spool destination of the print job on the administrator while a convenience for the user is maintained.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system comprising:
a user terminal that transmits a print job to be spooled and print job information, the print job information including user identification information and information on the print job;
a plurality of image forming apparatuses configured to execute a printing of the print job; and
a document management server that determines one of the image forming apparatuses as a spool destination of the print job, wherein
the document management server manages, according to a job list, print-job spool destinations associated with the user identification information,
when the document management server receiving print-job information from the user terminal is a first instance, the document management server randomly determines the one of the image forming apparatuses as the spool destination of the print job, registers the user identification information in the job list, and further associates with the user identification information, and registers in the job list, device identification information for the randomly determined image forming apparatus, and notifies the user terminal of, as the spool destination, the image forming apparatus that corresponds to the registered device identification information, and when the document management server receiving print-job information from the user terminal is a second or subsequent instance after the first instance, the document management server determines as the spool destination for the print job an image forming apparatus that corresponds to changed device identification information associated with the user identification information in accordance with the job list, and notifies the user terminal of the determination; wherein regardless of whether receiving of print job information from the user terminal is either a first instance or a second or subsequent instance after the first instance, the user terminal transmits the print job to the spool destination indicated by the notification from the document management server, a one of the image forming apparatuses, having accepted a login request from a user of the user terminal, requests of the document management server transmission of the job list, the document management server, in response to the request, transmits the job list to the image forming apparatus having accepted the login request, the document management server, after transmitting the job list, changes the device identification information registered in the job list to device identification information for the image forming apparatus having accepted the login request, and the image forming apparatus having accepted the login request confirms as the spool destination the image forming apparatus that corresponds to the user identification information in the transmitted the job list, reads the print job from the spool destination, and executes a printing process.

2. An image forming method comprising:
transmitting a print job to be spooled and print job information by a user terminal, the print job information including user identification information and information on the print job;
executing a printing of the print job by any of a plurality of image forming apparatuses;
through a document management server, managing, according to a job list, print-job spool destinations associated with the user identification information;
when receiving of print job information from the user terminal is a first instance,
through the document management server, randomly determining one of the image forming apparatuses as a spool destination of the print job by a document management server, registering the user identification information in the job list, and further associating with the user identification information, and registering in the job list, device identification information for the randomly determined image forming apparatus, and notifying the user terminal of, as the spool destination, the image forming apparatus that corresponds to the registered device identification information;

when the receiving of print job information from the user terminal is a second or subsequent instance after the first instance, determining as the spool destination for the print job an image forming apparatus that corresponds to changed device identification information associated with the user identification information in accordance with the job list, and through the document management server notifying the user terminal of the determinations;

regardless of whether receiving of print job information from the user terminal is either a first instance or a second or subsequent instance after the first instance, in the user terminal, transmitting the print job to the spool destination indicated by the notification from the document management servers; and in a one of the image forming apparatuses, on having accepted a login request from a user of the user terminal, requesting of the document management server transmission of the job list;

through the document management server, in response to the request, transmitting the job list to the image forming apparatus having accepted the login request;

through the document management server, after transmitting the job list, changing the device identification information registered in the job list to device identification information for the image forming apparatus having accepted the login request; and in the image forming apparatus having accepted the login request confirming as the spool destination the image forming apparatus that corresponds to the user identification information in the transmitted the job list, causing the print job to be transmitted from the image forming apparatus that is the spool destination, and executing a printing process.

* * * * *